Sept. 30, 1952          H. B. VROOM          2,612,428

RECORDER

Filed Jan. 7, 1950          5 Sheets-Sheet 1

Inventor
HAROLD B. VROOM

By Lindsey, Prutzman & Just
Attorneys

Sept. 30, 1952        H. B. VROOM        2,612,428
RECORDER

Filed Jan. 7, 1950                           5 Sheets-Sheet 2

Inventor
HAROLD B. VROOM

By Lindsey, Prutzman + Just
Attorneys

Sept. 30, 1952        H. B. VROOM        2,612,428

RECORDER

Filed Jan. 7, 1950        5 Sheets-Sheet 5

Inventor
HAROLD B. VROOM

By
Lindsey, Prutzman & Just
Attorneys

Patented Sept. 30, 1952

2,612,428

UNITED STATES PATENT OFFICE 2,612,428

RECORDER

Harold B. Vroom, Hartford, Conn., assignor to Veeder-Root Incorporated, Hartford, Conn., a corporation of Connecticut Application January 7, 1950, Serial No. 137,465

18 Claims. (Cl. 346—14)

The present invention relates to recording apparatus and, more particularly, to a device for attachment to a register mechanism for operation in unison therewith and arranged to permit the printing of a written record or receipt of the operation of the register. The device has particular utility in connection with gasoline dispensing apparatus to permit the printing of a sales slip in a simple and easy manner which shows the readings on the register and such other information as may be desired in connection with a sale.

An object of the invention is to provide a recording mechanism which can be attached to a conventional register for operation in unison therewith and which will duplicate the readings of the register on printing wheels to permit a record to be taken of these readings. Included in this object is the aim of providing an improved operating mechanism for the printing wheels and an improved interconnection between it and the register thereby causing improved operation of the register and recorder in unison during both registering and resetting.

A further aim is to provide in the device referred to an improved printing mechanism for taking an impression of the printing wheels which is simple and easy to operate and which will insure an accurate and legible printing of the readings on the register together with such other information as may be desired. In this connection, it is desired to provide a printing mechanism which will permit the carrying out of credit transactions using the "charga-plate" system much in vogue in department stores and the like wherein approved credit customers are provided with small identifying metal plates containing their names, addresses and charge account numbers, etc. in embossed letters and by means of which this information may be printed on a sales slip.

A further aim of the invention is to provide a recording device of the character referred to in which the printing wheels may be aligned preliminarily to printing without disturbing the accuracy of the amounts printed with respect to the amounts shown on the registers and in which the aligning operation is an automatic preliminary of the printing operation.

Another aim of the invention is to provide a recorder of this type which may be operated to print a receipt or sales slip independently of the operation of the resetting mechanism so as not to disturb the readings on the visible register to permit comparison between the register and the printed record and to permit reprinting if desired.

Another aim of the invention is to provide a device of this character which is economical and compact in size and shape so that it can be attached to a register in a minimum of required space and will not present an unsightly, cumbersome or inconvenient addition to the registering mechanism. It is also contemplated that the device of the present invention may be mounted at a place spaced from the registering mechanism if this is found to be desirable from a convenience standpoint as in the case of gasoline dispensing apparatus where it is generally more convenient to mount the recorder on the exterior of the pump housing.

A further aim of the invention is to provide a recording device of the character described which is foolproof in operation and which has a minimum of moving parts and is of rugged and simple construction such that it may be operated over long periods of time without failure and without requiring frequent replacement or repair even when subjected to hard usage and subjected to unfavorable atmospheric conditions.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
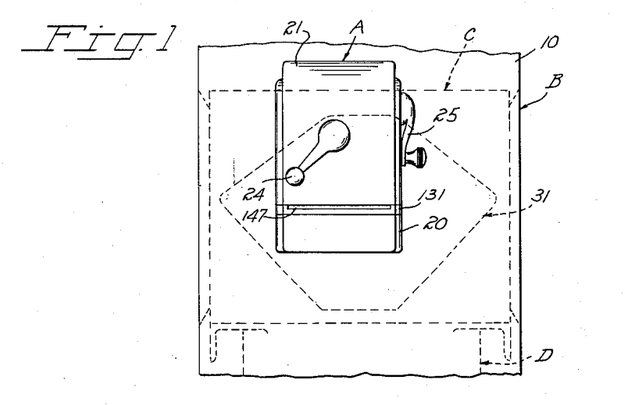
Figure 1 is an end view of a preferred embodiment of the present invention attached to the housing of a gasoline dispensing pump, the housing being shown merely diagrammatically and in fragmentary form.
Figure 2:
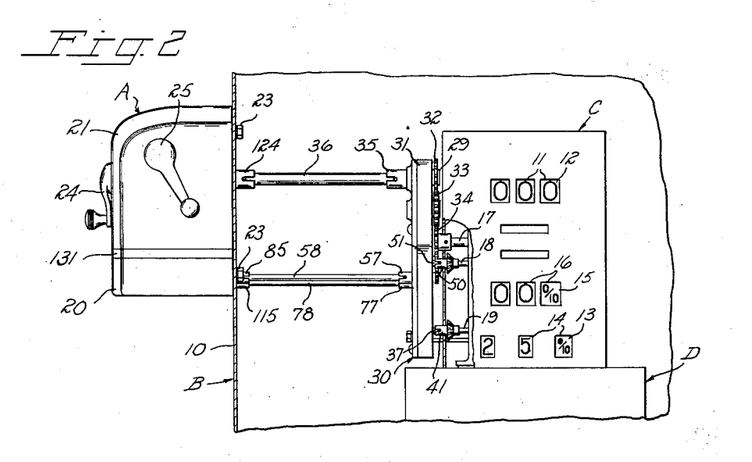
Fig. 2 is a side view of this embodiment of the device attached to the housing of a gasoline pump mechanism with the housing shown in fragmentary form and being cut away to reveal the connections between the device and a register and with the register also partially cut away to show certain of the operating connections.

Referring to the drawings, the recording device A of the present invention is shown in Figs. 1 and 2 as attached to the exterior of the housing 10 of a gasoline dispensing mechanism B. Interiorly of the housing 10 is mounted a well known type of registering mechanism C mounted in connection with a drive varying mechanism or variator D which connects the register with the meter (not shown) in such a way that the register can be made to register not only the amount of the gasoline dispensed but also the cost of the same in dollars and cents.

In the register C illustrated in Fig. 2 of the drawings, the register is provided with a plurality of windows 11 to reveal the indicia of number wheels 12 which appear in registry with the windows 11. In this illustration, the number wheels 12 register the cost of the gasoline dispensed. The price per gallon at which the gasoline is being sold and at which the variator D is set is indicated by number wheels 13 which appear at windows 14. The amount of gasoline dispensed is registered by number wheels 15 appearing at windows 16.

As is customary in devices of the type of the registering mechanism C, there is provided a reset shaft 17 which is adapted to be turned through one complete revolution of 360° in order to return the number wheels 15 and 12 to zero after the completion of a dispensing operation and before the initiation of a subsequent operation. The register is also provided with two shafts denoted as 18 and 19 which are driven in unison with the first wheels of the cost indicating wheels 12 and gallonage indicating wheels 15 respectively. In most installations, the shafts 18 and 19 are utilized to operate totalizer wheels (not shown) which are not resettable with the register and are utilized to register the total output and receipts of the dispensing apparatus. The three shafts referred to (reset shaft 17 and totalizer shafts 18 and 19) are the only portions of the register operatively connected with the recording device of the present invention.

The particular design and construction of the register C forms no part of the present invention. For details of construction of such a register, reference may be had, for example, to the patent to Slye, No. 2,264,557 issued December 2, 1941.

The recording device of the present invention in the embodiment shown in the drawings is provided with a housing consisting of a base portion 20 for containing the printing wheels and operating mechanism therefor and a cap portion 21, the latter being stream-lined and adapted to be fastened to the base portion 20 in any convenient manner such as by the screws 22. The housing of the recorder may be bolted to the housing 10 of the gas dispensing apparatus in any suitable manner such as by the use of bolts 23. On the exterior of the recorder A are a pair of handles or cranks 24 and 25, the former being provided to reset the register and printing mechanism to zero as described more particularly hereinafter, and the latter crank 25 being provided to carry out a printing operation also as more particularly described hereinafter.

*Connections to register*

Figure 3:
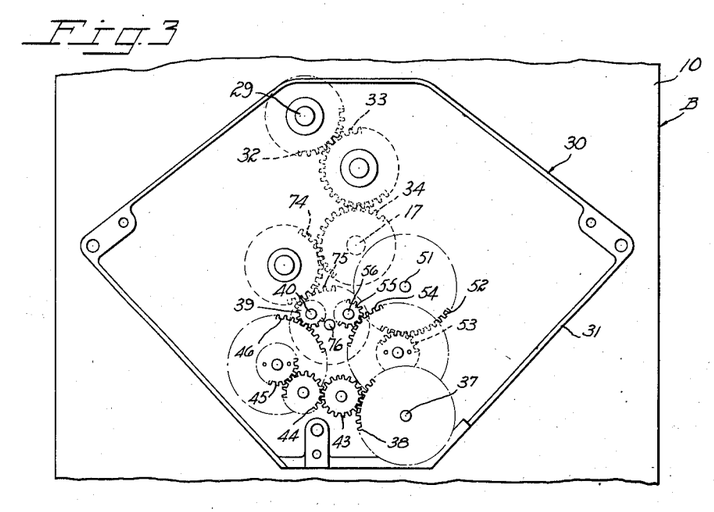
Fig. 3 is an end view of an adapter unit which is utilized in connecting the device of the present invention to the particular register in Fig. 2, the cover plate of the unit being removed to show the interior thereof.

In order to permit the attachment of the particular embodiment of the device of the present invention to a register of the type shown in the drawings, there is provided an adapter unit 30 which is best shown in Figs. 2 and 3 of the drawings. This adapter unit 30 is mounted in a housing 31 which is adapted to be bolted to the side of the register C. Mounted on the exterior of the housing 31 on the side facing the register are a pair of meshing gears 32 and 33. The gear 33 is arranged to mesh with a gear 34 which is fixed to the reset shaft 17 of the register previously referred to. The gear 32 is fixed to a short shaft 29 extending through the housing 31 and journaled therein and having on its opposite end a slotted coupling 35 for receiving a shaft 36, to be described more particularly hereinafter. Accordingly, turning movement of the shaft 36 may be utilized to turn the reset shaft 17 through gears 32 and 34 and idler gear 33.

Totalizer shaft 19 which is rotated at a rate to permit the registration of the quantity of fluid dispensed is provided with a slotted coupling 41 for receiving a short shaft 37 journaled in the housing 31 and on which is mounted a gear 38. This gear 38 operates gear 39 through idler gears 43 and 44, and coaxial gears 45 and 46, the latter two gears being fixed to each other for rotation in unison. Gear 39 is fixed to a shaft 40 which extends outwardly from the housing 31 and is provided with a slotted coupling (not shown) similar to slotted coupling 35 for receiving a shaft 42 adapted to extend to the recorder for driving the gallonage printing wheels, as more particularly described hereinafter. The gear ratios employed are such that shaft 42 is rotated at ten times the speed of totalizer shaft 19, this for the reason that in most registers, the register wheels will be rotated one count for each one-tenth turn of totalizer shaft 19 whereas, in the recorder of the present invention, as more particularly explained hereinafter, a complete turn of shaft 42 is required to advance the printing wheels G one count.

The cost totalizer shaft 18 is similarly provided with a slotted coupling 50 for attachment of a shaft 51 extending into the housing 31 on which is mounted a gear 52. Gear 52 meshes with a gear 53 fixed to gear 54, the latter being in mesh with a gear 55 fixed to a shaft 56 extending outwardly of the housing 31 and being provided with a slotted coupling 57 to receive a shaft 58 for driving the cost printing wheels of the recording device as more particularly described hereinafter. Here again, the gear ratios employed are such that the shaft 58 is rotated ten times for each rotation of the totalizer shaft 18.

As previously mentioned, reset shaft 17 of the register is adapted to be rotated by the shaft 36 through the gear train composed of gears 32, 33 and 34. Gear 34 also meshes with an idler gear 74 which in turn meshes with a gear 75 fixed to a shaft 76 extending through the housing 31 and carrying a coupling 77 on its outer end for reception of a shaft 78 extending to the recorder. Accordingly, the shaft 78 will be rotated in unison with the reset shaft 17 when the register is being reset to zero.

Operation of printing wheels

In order to permit the printing of indicia corresponding to the setting of the cost wheels 12 and amount wheels 15 of the register, there are provided two sets of printing wheels E and G. Each set in the embodiment shown consists of three printing number wheels 60. As is conventional in printing wheel constructions, the wheels 60 are formed with raised indicia about their periphery, in this case numerals from "0" to "9," which can be utilized to print these numbers in a printing operation. The two sets of printing wheels E and G are mounted for free rotation on a common shaft 61, which shaft 61 is journaled in uprights 62 supported on the base 20. The printing wheels of set G, in this embodiment, correspond to the volume or gallons wheels 15 of the register while the set of wheels E correspond to the register cost wheels 12.

Each of the printing wheels 60 is similar in construction and therefore the description will be limited to but one of them. Each wheel 60 has fixed thereto a notched disk 63 provided with peripheral notches 64 corresponding in number to the indicia on the wheel, and one of these notches, denoted at 64', is made somewhat deeper than that of the remaining notches. The notches of the disk 63 are adapted to be engaged by spring pressed fingers 65 of varying inclination pivotally mounted on a U-shaped yoke 66 in the case of the gallonage printing wheels G, and a similar yoke 67 in the case of the cost printing wheels E. These yokes 66 and 67 are freely mounted on the shaft 61 previously referred to as supporting the printing wheels E and G. When the yokes 66 and 67 are oscillated on the shaft 61, the fingers 65, in combination with the notches 64 and deep notches 64' of the disks 63, act to advance the printing wheels of lowest order in a stepwise fashion and also to transfer the count from wheels of lower order to wheels of higher order. As will be apparent, when the yokes 66 and 67 are moved in a clockwise direction as viewed in Fig. 9 of the drawings, the finger 65, having the greatest inclination toward the printing wheel disks and cooperating with the printing wheel of lowest order, will first advance the printing wheel of lowest order one count by engagement of the finger 65 with a notch 64 of the disk 63 associated with the first wheel 60. This single stepwise movement of the wheel of lowest order is repeated for each oscillation of the yoke until the deep notch 64' is engaged, this being when the printing wheel is turned from "9" to "0." The deep notch 64' permits the fingers 65 to move in sufficiently to permit the second finger associated with the next printing wheel of higher order to engage a notch 64 in the disk 63 of that printing wheel and advance the wheel one count. This sequence of operations is repeated until the second printing wheel has been advanced to "9," whereupon the deep notch 64' of its notched disk 63 is engaged by the associated finger 65 which permits the finger 65 for the printing wheel of highest order to engage in one of the notches 64 of the notched disk 63 of the printing wheel of higher order and thus advance that wheel.

Figure 9:
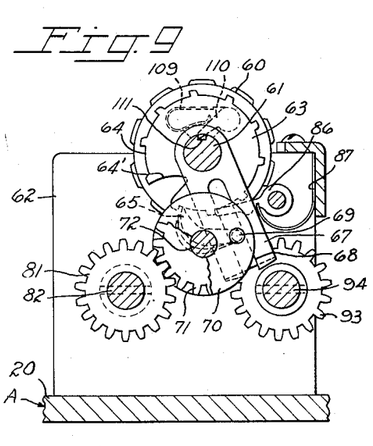
Fig. 9 is an enlarged cross sectional view taken along the line 9—9 of Fig. 8.

The oscillations of the yokes 66 and 67 are carried out in a similar manner. As best shown in Fig. 9 of the drawings, the yoke 67 is provided with a slot 68 in which rides a pin 69 carried by a disk 70 which is fixed to a gear 71 rotatably supported on a shaft 72 journaled in the adjacent upright 62. The gear 71 meshes with a gear 81 which is fixed to a shaft 82, this shaft being connected through a one-way drive ball clutch 83 to a shaft 84. Shaft 84 is provided with a coupling 85 for receiving the shaft 58 previously referred to as extending from the register and being driven at a ten to one ratio by the cost totalizer shaft 18 thereof. Accordingly, the yoke 67 is oscillated through one complete cycle for each one-tenth turn of totalizer shaft 18. A pawl 86 may be provided for engagement with the notched disks 63 and urged into engagement therewith by spring 87 to prevent reverse turning of the printing wheels.

Similarly, the yoke 66 is driven by engagement with a pin 90 carried by disk 91 secured to gear 92 which is rotatably mounted on a stud 79 positioned in the adjacent upright 62. Gear 92 meshes with a gear 93 which is fixed to one end of a shaft 94. Shaft 94 is secured at its opposite end through a one-way drive ball clutch 95 to shaft 96 having a coupling 97 for connection to the shaft 42 extending from the register as previously described and being driven at a ten to one ratio by the gallonage totalizer shaft 19 of the register.

Figure 11:
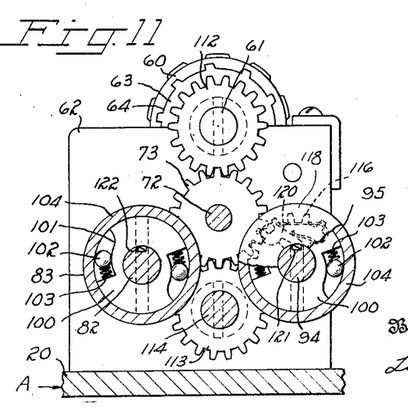
Fig. 11 is an enlarged cross sectional view taken along the line 11—11 of Fig. 8.

The one-way drive ball clutches 83 and 95 are similar in construction and are shown in detail in Fig. 11 of the drawings. These clutches comprise a hub portion 100 fixed to the driven shaft, in this case shafts 82 and 94 respectively. These hub portions 100 are provided with grooves 101 of varying depth in which are received balls 102 which are urged toward the shallower portion of the grooves 101 by springs 103. Encircling the hub portions 100 are shells 104 which are fixed to the driving shafts, in this case, shafts 96 and 84 respectively. It thus will be seen that, when the shafts 84 and 96 are turned in a driving or registering direction, they will rotate the shafts 94 and 82 respectively, which, in turn, will actuate the yokes 66 and 67 to advance the printing wheels E and G. However, by reason of the ball clutches 83 and 95, the yokes 66 and 67 may be advanced by rotating the shafts 82 and 94 independently of and without rotating the shafts 84 and 96.

For convenience herein in describing the operation of the yokes 66 and 67, the position shown in Fig. 9 will be referred to as the "fully retracted position"; the pivoting movement of the yoke in a clockwise direction as viewed in this same figure which acts to advance the wheels one count will be referred to as "advancement" of the yoke; the farthest pivoted position away from that shown will be referred to as the "fully advanced position"; and return pivoting movement of the yoke to the full retracted position which takes place without imparting any motion to the number wheel and permits the fingers 65 to engage in a subsequent notch 64 will be referred to as "retraction" of the yoke.

As explained more particularly hereinafter, it is desired, in order to avoid error in correlation between the printing wheels and register wheels when the receipt or record is printed, to retract the yokes during the first half count of the register wheels and to advance them during the last half of the count.

Resetting

As previously mentioned, the printing wheels 60 are freely rotatable on the shaft 61. Each of the printing wheels 60, however, carries a pivoted pawl 110 biased toward the shaft by a spring 109, as best shown in Fig. 9 of the drawings, which will permit the wheel 60 to be turned in a registering direction independently of the shaft 61 but which will be engaged by a longitudinal groove 111 in the shaft 61 if the shaft 61 is rotated. Accordingly, the printing wheels E and G can be reset to zero by turning the shaft 61 through one complete revolution in the direction of rotation of the printing wheels.

In order that the shaft 61 may be turned through a complete revolution to reset the sets of printing wheels E and G, one end thereof is provided with a gear 112 fixed thereto which meshes with an idler gear 73 rotatably mounted on the shaft 72 previously mentioned. Gear 73 also meshes with gear 113 fixed to a shaft 114 which shaft is provided with a coupling 115 for receiving the shaft 78 previously referred to as extending from the register and being operated in unison with the reset shaft 17 thereof. Accordingly, when the reset shaft 17 is rotated to reset the register, the shaft 61 is also rotated to reset the sets of printing wheels E and G to zero.

Figure 10:
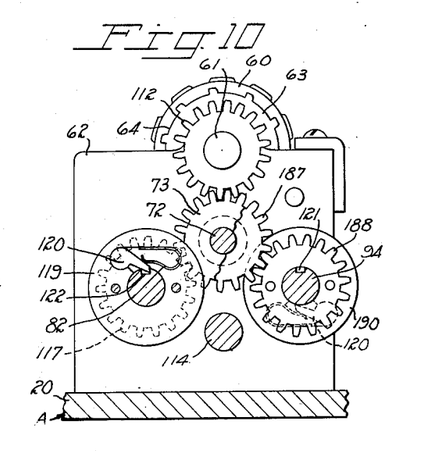
Fig. 10 is an enlarged cross sectional view taken along the line 10—10 of Fig. 8.
Figure 12:
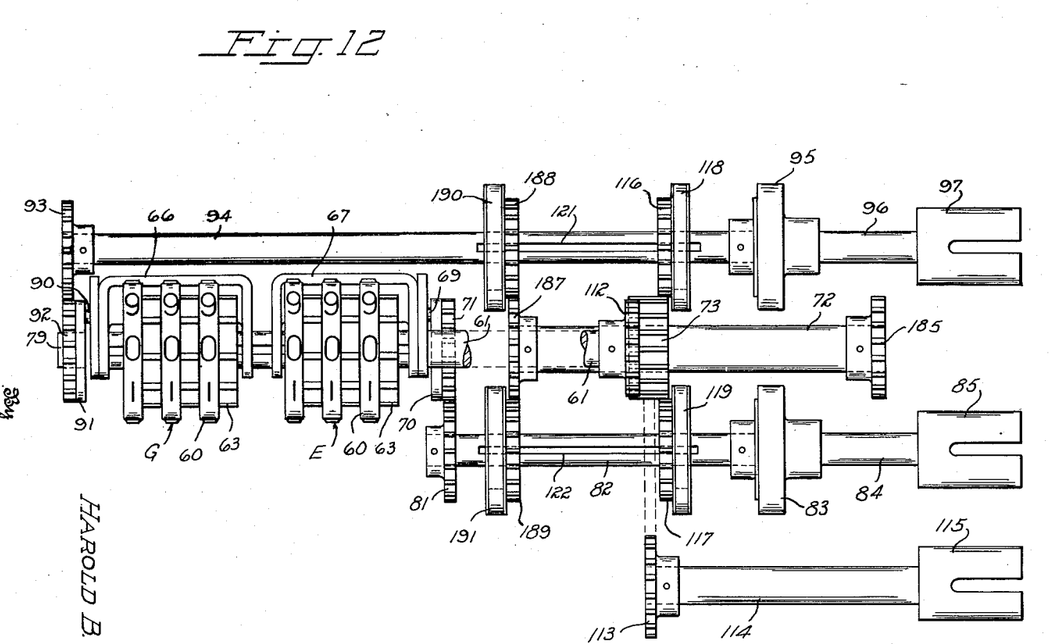
Fig. 12 is an enlarged diagrammatic view of the driving and resetting mechanism for the printing wheels.

It will be appreciated that, in order to accomplish the desired synchronization of printing wheels and register wheels previously mentioned in a subsequent counting operation, the yokes 66 and 67 and the driving mechanism therefor must also be reset, in this case, to the fully advanced position. This is accomplished in the device of the present invention by rotating the shafts 82 and 94 to effect this positioning of the yokes when the shaft 61 is turned through a complete revolution to reset the sets of printing wheels E and G to zero. The mechanism for carrying out this operation is best shown in Fig. 10 of the drawings and comprises gears 116 and 117 freely rotatable on the shafts 94 and 82, respectively, and meshing with the idler gear 73. Gear 73, as previously mentioned, is rotated one complete revolution by gear 113 attached to reset shaft 114 during a resetting operation. Fixed to each of the gears 116 and 117 are disks 118 and 119, respectively, which carry spring-pressed pawls 120 adapted to engage in longitudinal grooves 121 and 122 of shafts 94 and 82, respectively, and rotate these shafts when the gears 116 and 117 are turned in a resetting direction. Accordingly, the shafts 94 and 82 will be picked up by the pawls 120 at whatever rotated position the shafts may be in and will be turned to the desired initial setting when the shaft 114 is turned through one complete revolution. In the specific embodiment shown, the desired initial setting of shafts 94 and 82 which brings the yokes to the fully advanced position is shown, for purposes of illustration, with the grooves 121 and 122 on top, as viewed in Figs. 10, 11 and 12. The gears 116 and 117 are meshed with gear 73 in such relatively rotated positions that, when reset shaft 114 is in its initial starting position, the pawls 120 of disks 118 and 119 are located at the top of shafts 94 and 82, as shown in the drawings. Thus, when the disks 118 and 119 are turned through one complete revolution, they will rotate shafts 94 and 82 always to the desired initial setting with the yokes fully advanced. Accordingly, in a subsequent dispensing operation, the yokes will be retracted during the first half count of the register and advanced to move the printing wheels during the last half of the count. It will be appreciated that the shafts 94 and 82 can be rotated in a clockwise direction, as viewed in Fig. 10, independently of any turning of the shaft 72 during a registering operation, for example.

Figure 5:
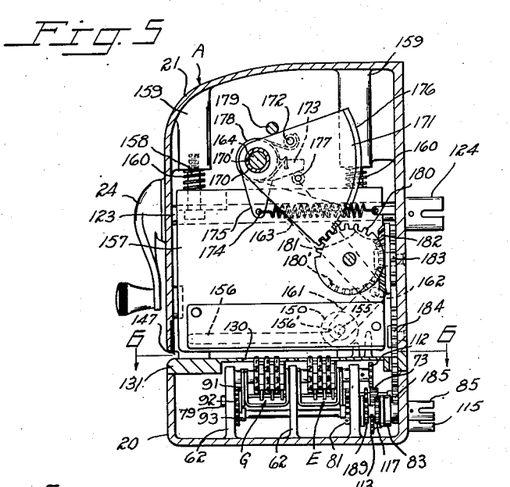
Fig. 5 is a side view with the side plate portion removed to show the interior of the device.

As previously mentioned, the register C and the recorder are adapted to be reset to zero in unison by operation of the shaft 36 and also, as previously mentioned, there is provided a crank handle 24 on the recorder for effecting this resetting operation. As best shown in Fig. 5 of the drawings, the crank handle 24 is fixed to a shaft 123 extending through the cap portion 21 of the recorder housing and journaled therein and having a coupling 124 at its inner end for attachment to the shaft 36. Accordingly, by rotating the crank handle 24, it is possible to reset the register and the recorder in unison.

It is contemplated, in accordance with the invention, that the register mechanism C will be provided with a suitable stop of any conventional type to insure that the resetting mechanism is turned through exactly one complete cycle when the operating crank handle 24 is turned by the operator.

Printing mechanism

Figure 7:
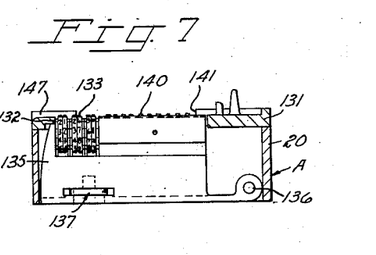
Fig. 7 is a cross sectional view taken along the line 7—7 of Fig. 6.
Figure 8:
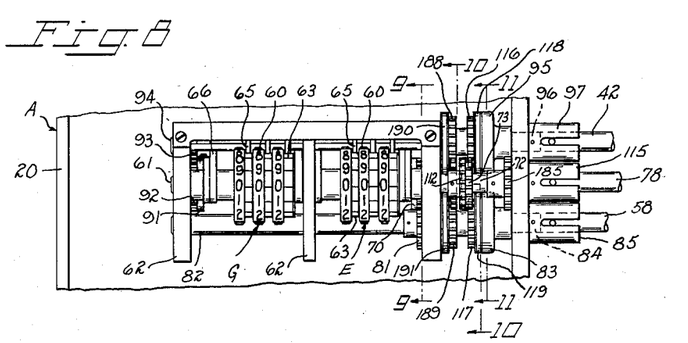
Fig. 8 is an enlarged plan view of the printing wheels and operating mechanism therefor.

As previously mentioned, the sets of printing wheels E and G are intended to be used to print the cost and volume totals shown on the register C at the completion of a dispensing operation. Accordingly, the periphery of the printing wheels of sets E and G are permitted to extend through an opening 130 in a plate 131 placed across the top of the base portion 20 of the recorder housing. Adjacent thereto and extending into a similar opening 132 in plate 131 are a series of printing wheels 133 which are mounted on a shaft 134 carried by a frame 135 pivotally mounted at 136 in the base portion 20 of the recorder housing, as best shown in Fig. 7 of the drawings. The printing wheels 133 may have any desired indicia thereon so as to indicate, for example, the date of the transaction and/or the name of the operator, etc. These printing wheels 133 are adapted to be set by hand merely by swinging the frame 135 downwardly to permit the wheels 133 to be turned manually. The frame 135 is retained in its upward printing position by a suitable latch mechanism indicated at 137. In alignment with the printing wheels 133 and also mounted on the frame 135 is a printing plate 140 which may carry additional desired indicia such as the name and address of the service station and/or advertising matter, etc. There is also provided in the cap portion 21 of the recorder housing a slot 141 registering with the top of the plate 131 so as to permit the insertion of a conventional charga-plate 142 which can be merely a metal plate having raised indicia identifying the purchaser and his account number, etc. A gate 143 received in a slot 144 and urged downwardly by springs 145 normally closes the slot 141 to prevent the entrance of moisture, etc. and also assists in positioning the charga-plate 142 when inserted therein.

Accordingly, when the charga-plate 142 is inserted through the slot 141 and the frame 135 is latched in its upward position, there is then in alignment all of the desired indicia for printing a sales slip or receipt, namely—the identity of the purchaser, identification of the station and date, etc., and the amount and cost of the gasoline which has been dispensed.

Figure 6:
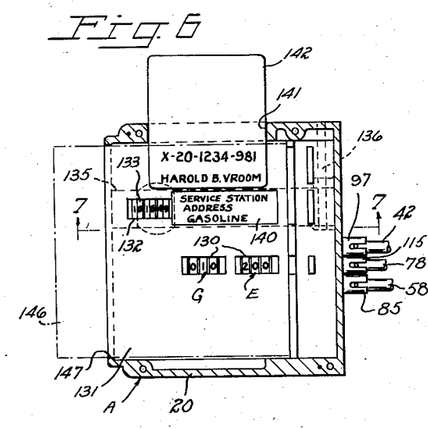
Fig. 6 is a cross sectional view taken along the line 6—6 of Fig. 5.

It is contemplated, in accordance with the invention, that a printed receipt or sales slip will be made on an accounting form widely used commercially and consisting of a plurality of sheets of paper provided with a carbon surface or including carbon paper sheets so that a record will be obtained on a plurality of sheets merely by pressing the printing indicia thereagainst and without any provision for inking the printing members. The preparation of such manifold forms and their construction forms no part of the present invention and it is contemplated that any one of the number of readily available types can be utilized. Such a form, as indicated diagrammatically by dot and dash lines at 146 in Fig. 6, is inserted by the operator through slot 149 to overlie the printing members whenever it is desired to print a record of a transaction.

In order to print the manifold forms with the various indicia referred to, there is provided an individual roller 150 for each of the sets of indicia. Each roller 150 is arranged to be rolled across a portion of the manifold form resting on one of the sets of printing indicia, i. e., one roller for charga-plate 142, a second roller for printing wheels 133 and plate 140, and a third roller for the sets of printing wheels E and G.

Each of the rollers 150 is mounted on a shaft 155, the ends of which are received in elongated grooves 156 in an individual frame 157. The mounting mechanism for each roller 150 is the same and identical reference numerals will be utilized throughout.

The frames 157 are supported on bolts 158 which are threadably and adjustably received in depending posts 159 in the cap portion 21 of the recorder housing. The frames 157 rest on the head of the bolts 158 which thereby limits the lowermost position of the rollers 150. The frames 157 are urged toward the printing indicia by relatively heavy springs 160 surrounding the bolts 158.

The grooves 156 are formed as best shown in Fig. 5 of the drawings and are so arranged that the rollers 150 will be raised above the level of the slots 141 and 147 when the roller is in the "at rest" position, as shown in Fig. 5 of the drawings. As will be noted, the grooves 156 are provided with an upwardly curved end portion 156' which permits this retraction of the rollers 150. When the rollers 150 are moved from right to left, as viewed in Fig. 5 of the drawings, the rollers 150 are first brought downwardly to engage the manifold form and press it against the printing indicia and the rollers then travel the entire width of the device to insure that all of the printing indicia is brought into contact with the manifold form. When the rollers 150 are moved from left to right, as viewed in Fig. 5 of the drawings, the reverse action takes place and the rollers are finally drawn upwardly above the level of the form.

In order to permit operation of the rollers 150, the shafts 155 are journaled in yokes 161 which are pivotally fastened at 162 to arms 163 which, in turn, are fixed at the other end to a shaft 164 extending transversely of the housing. Accordingly, when the shaft 164 is rotated in a clockwise direction, as viewed in Fig. 5, the arms 163 will also be moved or pivoted in a clockwise direction causing the rollers to move from right to left in the grooves 156. Reversely, when the shaft 164 is turned in a counterclockwise direction, the rollers 150 are returned to the initial or starting position shown in dotted lines in Fig. 5 of the drawings.

In order to rotate the shaft 164, the crank handle 25 previously referred to is turned by the operator. This crank handle 25 is fixed to a hub 170 which is journaled in the recorder housing and which has fixed thereto a gear segment 171. The hub 170 is coaxially mounted with respect to shaft 164 and has a bore 170' for rotatably receiving the end of shaft 164. On one side of the gear segment is a pin 172 which is adapted to form a lost motion connection with an arm 173 fixed to the shaft 164. When the crank handle 25 is turned in a clockwise direction, as viewed in Fig. 5, the pin 172 engages the arm 173, causing the shaft 164 to be rotated and causing the printing operation to take place, as previously described.

Return movement of the shaft 164 is effected by means of a spring 174 extending between the housing and an arm 175 also fixed to the shaft, this spring being tensioned while the handle and hence the shaft 164 is turned in the initial direction. Return movement of the shaft 164 is halted when the roller shafts 155 reach the ends of grooves 156 at the curved portion 156'. The gear segment 171 and hence hub 170 and handle 25 are returned the rest of the way to initial starting position by a spring loop 178 extending around a hub and connected at its ends to arm 173 and pin 172. Initial starting position of gear segment 171 is controlled by a stop 179. If for some reason rollers 150 should become stuck, such as because of a too thick manifold form or charga-plate, for example, and spring 174 is not sufficiently strong to return the mechanism to initial position, this can be corrected manually by turning the crank handle 25 in a reverse direction, it being noted that the pin 177 on gear segment 171 will engage the lower edge of arm 173 and return it and the mechanism operated thereby to starting position.

It will be appreciated that a dispensing operation might be halted while one (or more) of the printing wheels of sets E and G is being advanced, i. e., after initiation but prior to completion of the advancement. If this occurs and is not corrected, the printing wheel in a state of partial advancement will not be in a condition to print or will print two partial numbers thereby leading to confusion. Accordingly, provision has been made, in accordance with the invention, to properly align the printing wheels by completing the advancement of any such partially advanced printing wheels when the handle 25 is turned to effect a printing operation.

Figure 4:
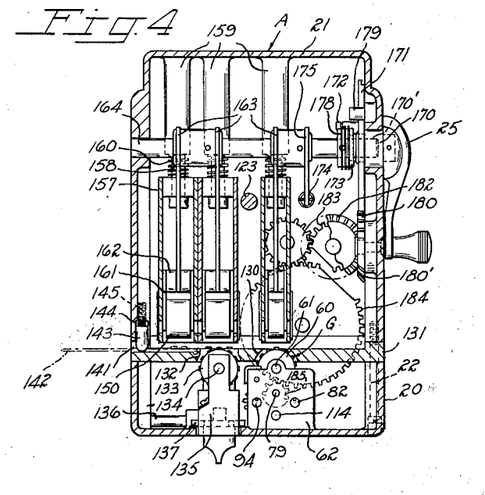
Fig. 4 is an end view of the device of the present invention with the end plate portion removed to show the interior of the device.

As best shown in Figs. 4 and 5 of the drawings, a gear 180 of special design is mounted for rotation by the gear segment 171. Both gear segment 171 and the gear 180 are provided with interrupted teeth so arranged that the gear 180 will be rotated only for a partial revolution of the handle 25 and that will occur only at the initial stage of movement of the gear segment 171. Further movement of the gear segment 171 causes an offset edge portion 176 thereof to engage in a similarly offset notch 181 in gear 180 which thereby locks the gear 180 in the position to which it is rotated by gear segment 171. The gear 180 is formed with bevel gear portion 180' which meshes with a bevel gear 182 fixed to a gear 183 rotatably mounted on the housing. The gear 183 drives a gear 184 which, in turn, meshes with a gear 185 fixed to the shaft 72 of the printing wheel mechanism.

Intermediate the ends of shaft 72 there is fixed a gear 187 which meshes with gears 188 and 189 rotatably mounted on shafts 94 and 82, respectively, and which are similar to the gears 116 and 117 referred to previously. The gears 188 and 189 are fixed to disks 190 and 191, respectively, which disks are of exactly the same type as disks 118 and 119 previously described and each of which carries a similar spring-pressed pawl 120 for engaging the longitudinal grooves 121 and 122 in the shafts 94 and 82 when the disks are turned in a clockwise direction, as viewed in Fig. 10 of the drawings, but permitting the shafts 94 and 82 to be advanced independently of rotation of the disks 190 and 191, as during resetting or registering, as previously described. The gears 188 and 189 are meshed with gear 187 in a relatively rotated position such that, when shaft 72 is in its initial rotated position, the pawls 120 of disks 190 and 191 are located on the underside of shafts 94 and 82 as shown in the drawings. This position is 180° from the position of the pawls of the disks 118 and 119 in their initial rotated position. Accordingly, rotation of the disks 190 and 191 through one complete revolution will cause the pawls 120 thereof to engage in the grooves 121 and 122 in whatever rotated position the shafts 94 and 82 are in and will advance these shafts to a position with the grooves 121 and 122 underneath, i. e., exactly 180° from that shown in the drawings. If it is not desired to utilize the same grooves 121 and 122 for engagement by both sets of disks, the same result can be accomplished by using separate grooves for engagement by the disks 118 and 119 which may be angularly spaced from the grooves 121 and 122. In that event, the location of pawls 120 of disks 190 and 191 with respect to the position of the pawls 120 of disks 118 and 119 is immaterial and will depend on the location of the separate grooves, it being necessary only that the operation of the disks 190 and 191 will be to rotate the shafts 94 and 82 to a rotated position 180° from that to which it is rotated by disks 118 and 119 when the disks are given one complete revolution. The gear ratios employed are such that the plates 190 and 191 are rotated one complete turn when the gear 180 is only partially turned as described by the gear segment 171. Accordingly, the yokes 66 and 67 of the printing wheel sets E and G will be pivoted to the fully retracted position before the printing of the sales slip takes place, and in so doing will first complete any partial advancement of the yoke and printing wheels. Accordingly, it is insured that the printing wheels will be brought into proper alignment so that an accurate and legible printing of the cost and volume and gasoline dispensed can be made. Also, because the yokes 66 and 67 are pivoted in a direction for advancing the printing wheels only after the register wheels have been advanced a half count, as previously described, it is insured that, even though the printing wheels are advanced, they will still show a legitimate charge, and there will be no advancement of the printing wheels if less than half a count is registered on the register wheels.

It thus will be seen that, in the operation of the recorder of the present invention, there will always be an accurate synchronization and correspondence between the printing wheels and the register wheels and this desired relationship is not disturbed in any way by repeated resetting and printing operations even though the latter requires an aligning of the printing wheels which advances the printing wheels only in legitimate amounts and operates through the driving mechanism (as does the resetting mechanism) thereby avoiding duplication of elements. Accurate printing is assured in a simple and convenient manner, and the device is compact, economical in design, easy to operate, and foolproof in functioning.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a recorder for connection to a register of the type having a first rotatable shaft for resetting the register to zero and a second shaft rotated in response to the number of units registered, the combination comprising a plurality of wheels having printing indicia thereon, means for advancing said wheels connectible to said second shaft, means for resetting the printing wheels to zero connectible to said first shaft, means for adjusting the rotated position of the printing wheels to align the printing indicia thereof, means for taking a printed impression of said printing wheels, and means operable independently of the resetting means for actuating the aligning means and the printing means in sequence.

2. In a recorder for connection to a register of the type having a first rotatable shaft for resetting the register to zero and a second shaft rotated in response to the number of units registered, the combination comprising a plurality of printing wheels having printing indicia thereon, means for advancing said wheels in stepwise fashion including a reciprocable member, means for reciprocating the reciprocable member connectible to the said second shaft of the register, means for resetting the printing wheels to zero connectible to said first shaft of the register, means operated by the resetting means for moving the reciprocating means to a predetermined starting position, means for taking a printed impression of said printing wheels, and means operated by the printing means for moving the reciprocating means to a predetermined position to align the printing indicia of the printing wheels.

3. In a recorder for connection to a register of the type having a first rotatable shaft for resetting the register to zero and a second shaft rotated in response to the number of units registered, the combination comprising a plurality of printing wheels having printing indicia thereon, a reciprocable member arranged to advance the printing wheels one full count when the member is advanced, means including a rotatable drive shaft for advancing and retracting the reciprocal member in sequence when the shaft is rotated through one revolution, means including a one-way clutch for connecting the said rotatable drive shaft to the said second shaft of the register, means for resetting the printing wheels to zero including a rotatable reset shaft connectible to the first shaft of the register, means including a one-way drive operated by the reset shaft for rotating the said rotatable drive shaft to a position at which the reciprocable member is fully advanced when the reset shaft is turned, means for taking a printed impression of said printing wheels, and means including a one-way drive operated by the printing means for rotating the said rotatable drive shaft to a position at which the reciprocable member is fully retracted.

4. In a recorder for connection to a register of the type having a first rotatable shaft for resetting the register to zero and a second shaft rotated in response to the number of units registered, the combination comprising a plurality of printing wheels having printing indicia thereon, means including a rotatable drive shaft for advancing the printing wheels in stepwise fashion during alternate half turns of the drive shaft, means for connecting the drive shaft to said second shaft of the register arranged to cause rotation of the drive shaft when the second shaft is rotated in a registering direction but permitting the drive shaft to be rotated in the same direction independently of rotation of the second shaft, means for advancing the drive shaft to a position at which one of said alternate half turns is completed, means for resetting the printing wheels to zero connectible to the first shaft of the register, means forming a driving connection between the two last named means, means for taking a printed impression of said printing wheels, means for advancing the drive shaft to a rotated position at the start of one of said alternate half turns, and means forming a driving connection between the two last named means.

5. In a recorder for connection to a register of the type having a first rotatable shaft for resetting the register to zero and a second shaft rotated in response to the number of units registered, the combination comprising a plurality of printing wheels having printing indicia thereon, means including a rotatable drive shaft for advancing the printing wheels in stepwise fashion during alternate half turns of the drive shaft, means for connecting the drive shaft to said second shaft of the register arranged to cause the second shaft to rotate the drive shaft when the second shaft is rotated in a registering direction but permitting the drive shaft to be rotated in the same direction independently of rotation of the second shaft, means for advancing the drive shaft to a rotated position at which one of said alternate half turns is completed, means for resetting the printing wheels to zero connectible to the first shaft of the register, means forming a driving connection between the two last named means, means for advancing the drive shaft to a rotated position at the start of one of said alternate half turns, platen means mounted for movement relative to the printing wheels, and means for actuating the two last named means in sequence.

6. In a recorder for connection to a register of the type having a first rotatable shaft for resetting the register to zero and a second shaft rotated in response to the number of units registered, the combination comprising a plurality of printing wheels having printing indicia thereon, means including a rotatable drive shaft for advancing the printing wheels in stepwise fashion during alternate half turns of the drive shaft, means for connecting the drive shaft to said second shaft of the register arranged to cause the second shaft to rotate the drive shaft when the second shaft is rotated in a registering direction but permitting the drive shaft to be rotated in the same direction independently of rotation of the second shaft, first means for advancing the drive shaft including a rotatable member and a pawl carried thereby for engaging a groove in the drive shaft, means for resetting the printing wheels to zero connectible to the first shaft of the register, means interconnecting the two last named means arranged to rotate the rotatable member through one complete revolution to advance the drive shaft to a position at which one of said alternate half turns is completed when the resetting means is actuated, means for taking a printed impression of said printing wheels, second means for advancing the drive shaft including a rotatable member and a pawl carried thereby for engaging a groove in the drive shaft, and means forming a driving connection between the two last named means for rotating the last named rotatable member through one complete revolution to advance the drive shaft to a position at the start of one of said alternate half turns when a printing operation is initiated.

7. In a recorder for connection to a register of the type having a first rotatable shaft for resetting the register to zero and a second shaft rotated in response to the number of units registered, the combination comprising a rotatable reset shaft connectible to the first shaft of the register, a plurality of printing wheels in side by side relationship mounted for rotation on said shaft, means forming a one-way drive between the wheels and the shaft on which the wheels are mounted to permit the wheels to be advanced independently of rotation of the shaft but causing the wheels to be advanced to zero when the shaft is rotated a predetermined amount in a registering direction, means including a rotatable drive shaft for advancing the printing wheels in stepwise fashion during alternate half turns of the drive shaft, means for advancing the drive shaft to a position at which one of said alternate half turns is completed, gear means between the drive shaft advancing means and the rotatable reset shaft, means for connecting the drive shaft to said second shaft of the register arranged to cause rotation of the drive shaft when the second shaft is rotated in a registering direction but permitting the drive shaft to be rotated in the same direction independently of rotation of the second shaft, means for advancing the drive shaft to a rotated position at the start of one of said alternate half turns, platen means mounted for movement relative to the printing wheels, and means for actuating the two last named means in sequence.

8. In a recorder for connection to a register of the type having a first rotatable shaft for resetting the register to zero and a second shaft rotated in response to the number of units registered, the combination comprising a rotatable reset shaft connectible to the first shaft of the register, a plurality of printing wheels in side by side relationship mounted for rotation on said shaft, means including a groove in the reset shaft and pawls carried by the wheels to permit the wheels to be advanced independently of rotation of the shaft but to cause the wheels to be advanced to zero when the shaft is rotated a predetermined amount in a registering direction, means including a rotatable drive shaft for advancing the printing wheels in stepwise fashion during alternate half turns of the drive shaft, means for advancing the drive shaft to a position at which one of said alternate half turns is completed, gear means between the drive shaft advancing means and the rotatable reset shaft, means for connecting the drive shaft to said second shaft of the register arranged to cause rotation of the drive shaft when the second shaft is rotated in a registering direction but permitting the drive shaft to be rotated in the same direction independently of rotation of the second shaft, means for advancing the drive shaft to a rotated position at the start of one of said alternate half turns, platen means mounted for movement relative to the printing wheels, and means for actuating the two last named means in sequence.

9. In a recorder for connection to a register of the type having a first rotatable shaft for resetting the register to zero and a second shaft rotated in response to the number of units registered, the combination comprising a rotatable reset shaft connectible to the first shaft of the register, a plurality of printing wheels in side by side relationship rotatably mounted on said shaft, means including a groove in the reset shaft and pawls carried by the wheels for causing the wheels to be advanced to zero when the shaft is rotated one full revolution in a registering direction but permitting the wheels to be advanced independently of rotation of the shaft, means including a rotatable drive shaft for advancing the printing wheels in a stepwise fashion during alternate half turns of the drive shaft, means for advancing the drive shaft to a position at which one of said alternate half turns is completed including a rotatable member and a pawl carried thereby for engaging a groove in the drive shaft, gear means interconnecting the reset shaft and the rotatable member, means for connecting the drive shaft to said second shaft of the register arranged to cause rotation of the drive shaft when the second shaft is rotated in a registering direction but permitting the drive shaft to be rotated in the same direction independently of rotation of the second shaft, means for advancing the drive shaft to a rotated position at the start of one of said alternate half turns including a rotatable member and a pawl carried thereby for engaging a groove in the drive shaft, platen means mounted for movement relative to the printing wheels, and means for rotating the last named rotatable member and actuating the platen means in sequence.

10. In a recorder for connection to a register of the type having a first rotatable shaft for resetting the register to zero and a second shaft rotated in response to the number of units registered, the combination comprising a plurality of printing wheels having printing indicia thereon, a reciprocable member arranged to advance the printing wheels one full count when the member is advanced, means including a rotatable drive shaft for advancing and retracting the reciprocal member in sequence when the shaft is rotated through one revolution, means for connecting the drive shaft to said second shaft of the register arranged to cause rotation of the drive shaft when the second shaft is rotated in a registering direction but permitting the drive shaft to be rotated in the same direction independently of rotation of the second shaft, means for advancing the drive shaft to a rotated position at which said reciprocable member is fully advanced, means for resetting the printing wheels to zero connectible to the first shaft of the register, means forming a driving connection between the two last named means, means for advancing the drive shaft to a rotated position at which the reciprocal member is fully retracted, means for taking a printed impression of said printing wheels, and means for actuating the two last named means in sequence.

11. In a recorder for connection to a register of the type having a first rotatable shaft for resetting the register to zero and a second shaft rotated in response to the number of units registered, the combination comprising a rotatable reset shaft connectible to the first shaft of the register, a plurality of printing wheels in side by side relationship rotatably mounted on said shaft, means including a groove in the reset shaft and pawls carried by the wheels for causing the wheels to be advanced to zero when the shaft is rotated one full revolution in a registering direction but permitting the wheels to be advanced independently of rotation of the shaft, means including a rotatable drive shaft for advancing the printing wheels in a stepwise fashion during alternate half turns of the drive shaft, means for advancing the drive shaft to a position at which one of said alternate half turns is completed including a rotatable member and a pawl carried thereby for engaging a groove in the drive shaft, gear means interconnecting the reset shaft and the rotatable member, means for connecting the drive shaft to said second shaft of the register arranged to cause rotation of the drive shaft when the second shaft is rotated in a registering direction but permitting the drive shaft to be rotated in the same direction independently of rotation of the second shaft, means for advancing the drive shaft to a rotated position at the start of one of said alternate half turns including a rotatable member and a pawl carried thereby for engaging a groove in the drive shaft, platen means mounted for movement relative to the printing wheels, a manually operable member, means forming a lost motion connection between said manually operable means and the platen means, and means including an interrupted gear member for actuating the last named rotatable member by the manually operable means prior to actuation of the platen means.

12. In a recorder for a liquid dispensing device of the type having a register provided with a first shaft for resetting the register to zero and a second shaft rotated in response to the number of units registered, the combination comprising a plurality of printing wheels in side by side relationship, a reset shaft for rotatably supporting the printing wheels, means for advancing the wheels to zero when the reset shaft is turned, manually operable crank means connected for simultaneous operation of the first shaft of the register and said reset shaft, means for advancing the printing wheels in stepwise fashion including a reciprocable member arranged to advance the wheels when the member is advanced, means including a drive shaft for advancing and retracting the reciprocable member in sequence when the shaft is turned through one revolution, means including a one-way clutch for connecting the drive shaft to the second shaft of the register, means on the drive shaft for advancing the shaft until the reciprocable member is fully advanced, gear means interconnecting the last named means and the reset shaft, means on the drive shaft including a rotatable member for advancing the shaft until the reciprocable member is fully retracted, platen members mounted for movement relative to the printing wheels, a second manually operable crank means, and means operated by the crank for actuating the rotatable means and the platen means in sequence.

13. In a recorder for a liquid dispensing device of the type having a register provided with a first shaft for resetting the register to zero and a pair of driven shafts which are rotated respectively in relationship to the quantity and cost of the liquid dispensed, the combination comprising two sets of printing wheels, means including a common reset shaft for resetting the printing wheels to zero and connectible to the said first shaft of the register, means including a pair of drive shafts for advancing the sets of printing wheels respectively in stepwise fashion during alternate half turns of the drive shafts, means for providing a one-way drive between the drive shafts and said driven shafts of the register respectively, means for advancing the drive shafts to positions at which the alternate half turns are completed, gear means interconnecting said shaft advancing means and the reset shaft, means for advancing the drive shafts to a rotated position at which the alternate half turns are started, means for taking a printing impression of said printing wheels, and means for actuating the two last named means in sequence.

14. In a recorder for a liquid dispensing device of the type having a register provided with a first shaft for resetting the register to zero and a pair of driven shafts which are rotated, respectively, in relationship to the quantity and cost of the liquid dispensed, the combination comprising a rotatable reset shaft connectible to the first shaft of the register for rotation in unison therewith, two sets of printing wheels mounted in side by side relationship on said reset shaft, means for advancing the printing wheels to zero when the reset shaft is turned through one revolution, a pair of reciprocable members arranged to advance the sets of printing wheels, respectively, in stepwise fashion when the reciprocable members are advanced, means including a pair of drive shafts for advancing and retracting the reciprocable members, respectively, when the drive shafts are rotated through one revolution, means including a one-way clutch for connecting the drive shafts to the driven shafts, respectively, of the register, means driven by the reset shaft for advancing the drive shafts to a rotated position at which the reciprocable members are fully advanced, platen means movable relative to the printing wheels, means for advancing the drive shafts to a rotated position at which the reciprocable members are fully retracted, and means for actuating the last-named means and the platen means in sequence.

15. In a recorder for a liquid dispensing device of the type having a register provided with a first shaft for resetting the register to zero and a pair of driven shafts which are rotated, respectively, in relationship to the quantity and cost of the liquid dispensed, the combination comprising a rotatable reset shaft connectible to the first shaft of the register for rotation in unison therewith, two sets of printing wheels mounted in side by side relationship on said reset shaft, means for advancing the printing wheels to zero when the reset shaft is turned through one revolution, a pair of reciprocable members arranged to advance the sets of printing wheels, respectively, in stepwise fashion when the reciprocable members are advanced, means including a pair of drive shafts mounted parallel to the reset shaft for advancing and retracting the reciprocable members, respectively, when the drive shafts are rotated through one revolution, means including a one-way clutch for connecting the drive shafts to the driven shafts, respectively, of the register, means including a rotatable member for advancing the drive shafts to a rotated position at which the reciprocable members are fully advanced, gear means including a gear on the reset shaft for rotating the rotatable member when the reset shaft is rotated, platen means movable relative to the printing wheels, means including a rotatable member for advancing the drive shafts to a rotated position at which the reciprocable members are fully retracted, a shaft parallel to the drive shafts having gear means for rotating the rotatable member, and means for rotating the last named shaft and actuating the platen means in sequence.

16. In a recorder for a liquid dispensing device of the type having a register provided with a first shaft for resetting the register to zero and a pair of driven shafts which are rotated, respectively, in relationship to the quantity and cost of the liquid dispensed, the combination comprising a rotatable reset shaft, means for turning the reset shaft and the first shaft of the register in unison, two sets of printing wheels mounted in side by side relationship on said reset shaft, means for advancing the printing wheels to zero when the reset shaft is turned through one revolution, a pair of reciprocable members arranged to advance the sets of printing wheels, respectively, in stepwise fashion when the reciprocable members are advanced, means including a pair of drive shafts for advancing and retracting the reciprocable members, respectively, when the drive shafts are rotated through one revolution, means including a one-way clutch for connecting the drive shafts to the driven shafts, respectively, of the register, means including rotatable members on the drive shafts driven by the reset shaft, each having a pawl for engaging a groove in the shaft for advancing the drive shafts to a rotated position at which the reciprocable members are fully advanced when the rotatable members are rotated through one revolution, platen means movable relative to the printing wheels, means including rotatable members on the drive shafts having pawls for engaging in grooves in the shafts for advancing the drive shafts to a rotated position at which the reciprocable members are fully retracted when the rotatable members are rotated through one revolution, and means for turning the last named rotatable members through one complete revolution and actuating the platen means in sequence.

17. In a recorder for a liquid dispensing device of the type having a register provided with a first shaft for resetting the register to zero and a pair of driven shafts which are rotated, respectively, in relationship to the quantity and cost of the liquid dispensed, the combination comprising a rotatable reset shaft connectible to the first shaft of the register for rotation in unison therewith, two sets of printing wheels mounted in side by side relationship on said reset shaft, means for advancing the printing wheels to zero when the reset shaft is turned through one revolution, a pair of reciprocable members arranged to advance the sets of printing wheels, respectively, in stepwise fashion when the reciprocable members are advanced, means including a pair of drive shafts for advancing and retracting the reciprocable members, respectively, when the drive shafts are rotated through one revolution, means including a one-way clutch for connecting the drive shafts to the driven shafts, respectively, of the register, means driven by the reset shaft for advancing the drive shafts to a rotated position at which the reciprocable members are fully advanced, platen means including a roller movable axially across the printing wheels, rotatable means for advancing the drive shafts to a rotated position at which the reciprocable members are fully retracted, means including a manually operable crank for actuating the last named rotatable means and the platen means in sequence, and spring means for returning the last named means to starting position.

18. In a recorder for a liquid dispensing device of the type having a register provided with a first shaft for resetting the register to zero and a pair of driven shafts which are rotated, respectively, in relationship to the quantity and cost of the liquid dispensed, the combination comprising a rotatable reset shaft, means including a manually operable member connectible to the first shaft of the register for rotating the reset shaft and first shaft in unison, two sets of printing wheels mounted in side by side relationship on said reset shaft, means for advancing the printing wheels to zero when the reset shaft is turned through one revolution, a pair of reciprocable members arranged to advance the sets of printing wheels, respectively, in stepwise fashion when the reciprocable members are advanced, means including a pair of drive shafts parallel to the reset shaft for advancing and retracting the reciprocable members, respectively, when the drive shafts are rotated through one revolution, means including a one-way clutch for connecting the drive shafts to the driven shafts, respectively, of the register, means including a pair of rotatable members mounted on the drive shafts and driven by the reset shaft for advancing the drive shafts to a rotated position at which the reciprocable members are fully advanced, platen means movable relative to the printing wheels, means including a pair of rotatable members mounted on the drive shafts for advancing the drive shafts to a rotated position at which the reciprocable members are fully retracted, a manually operable crank, means including an interrupted gear for rotating the last named rotatable means during a part of the rotation of the crank, and means including a lost motion connection for actuating the platen means during a subsequent portion of the rotation of the crank.

HAROLD B. VROOM.

REFERENCES CITED

The following references are of record in the file of this patent:

UNITED STATES PATENTS

| Number | Name | Date |
|---|---|---|
| 452,402 | Townsley | May 19, 1891 |
| 823,375 | Trinks | June 12, 1906 |
| 1,283,789 | Johnson | Nov. 5, 1918 |
| 1,439,163 | Harness | Dec. 19, 1922 |
| 1,770,079 | Leppla | July 8, 1930 |
| 2,086,363 | McMullen | July 6, 1937 |
| 2,087,315 | Bugg et al. | July 20, 1937 |
| 2,312,137 | Watson | Feb. 23, 1943 |
| 2,425,072 | Pearson | Aug. 5, 1947 |